US009472001B2

(12) United States Patent
Jeong et al.

(10) Patent No.: US 9,472,001 B2
(45) Date of Patent: Oct. 18, 2016

(54) IMAGE PROCESSOR, IMAGE RECONSTRUCTION METHOD, AND RADIATION IMAGING APPARATUS

(71) Applicants: SAMSUNG ELECTRONICS CO., LTD., Suwon-si (KR); SNU R&DB FOUNDATION, Seoul (KR)

(72) Inventors: Kye Young Jeong, Yongin-si (KR); Byung Kwan Park, Seoul (KR); Jae Mock Yi, Hwaseong-si (KR); Jae Sung Lee, Seoul (KR); Hong Jung, Seoul (KR); Jung Ah Son, Seoul (KR)

(73) Assignees: SAMSUNG ELECTRONICS CO., LTD., Suwon-si (KR); SNU R&DB FOUNDATION, Seoul (KR)

(*) Notice: Subject to any disclaimer, the term of this patent is extended or adjusted under 35 U.S.C. 154(b) by 69 days.

(21) Appl. No.: 14/463,274

(22) Filed: Aug. 19, 2014

(65) Prior Publication Data
US 2015/0055847 A1 Feb. 26, 2015

(30) Foreign Application Priority Data

Aug. 22, 2013 (KR) ........................ 10-2013-0099626

(51) Int. Cl.
*G06T 11/00* (2006.01)
(52) U.S. Cl.
CPC ........ *G06T 11/006* (2013.01); *G06T 2211/416* (2013.01); *G06T 2211/421* (2013.01)

(58) Field of Classification Search
None
See application file for complete search history.

(56) References Cited

U.S. PATENT DOCUMENTS

| 2006/0104410 | A1* | 5/2006 | Sauer ...................... A61B 6/032 378/4 |
| 2009/0225934 | A1* | 9/2009 | Hugg ...................... A61B 6/032 378/20 |
| 2010/0067758 | A1 | 3/2010 | Casey et al. |
| 2011/0091007 | A1 | 4/2011 | Betcke et al. |

FOREIGN PATENT DOCUMENTS

| JP | 2006-95297 A | 4/2006 |
| KR | 10-1207710 B1 | 12/2012 |
| KR | 10-1233984 B1 | 2/2013 |

OTHER PUBLICATIONS

Vandenberghe, Stefaan, et al. "Iterative reconstruction algorithms in nuclear medicine." Computerized medical imaging and graphics 25.2 (2001): 105-111.*

* cited by examiner

*Primary Examiner* — Bhavesh Mehta
*Assistant Examiner* — Menatoallah Youssef
(74) *Attorney, Agent, or Firm* — Sughrue Mion, PLLC

(57) ABSTRACT

The image reconstruction method includes performing a forward projection of a first image of an object using a line integral-based value and a point spread function (PSF)-based value to acquire a forward projection value, and performing a back projection of raw image data using the forward projection value to acquire a second image of the object.

18 Claims, 15 Drawing Sheets

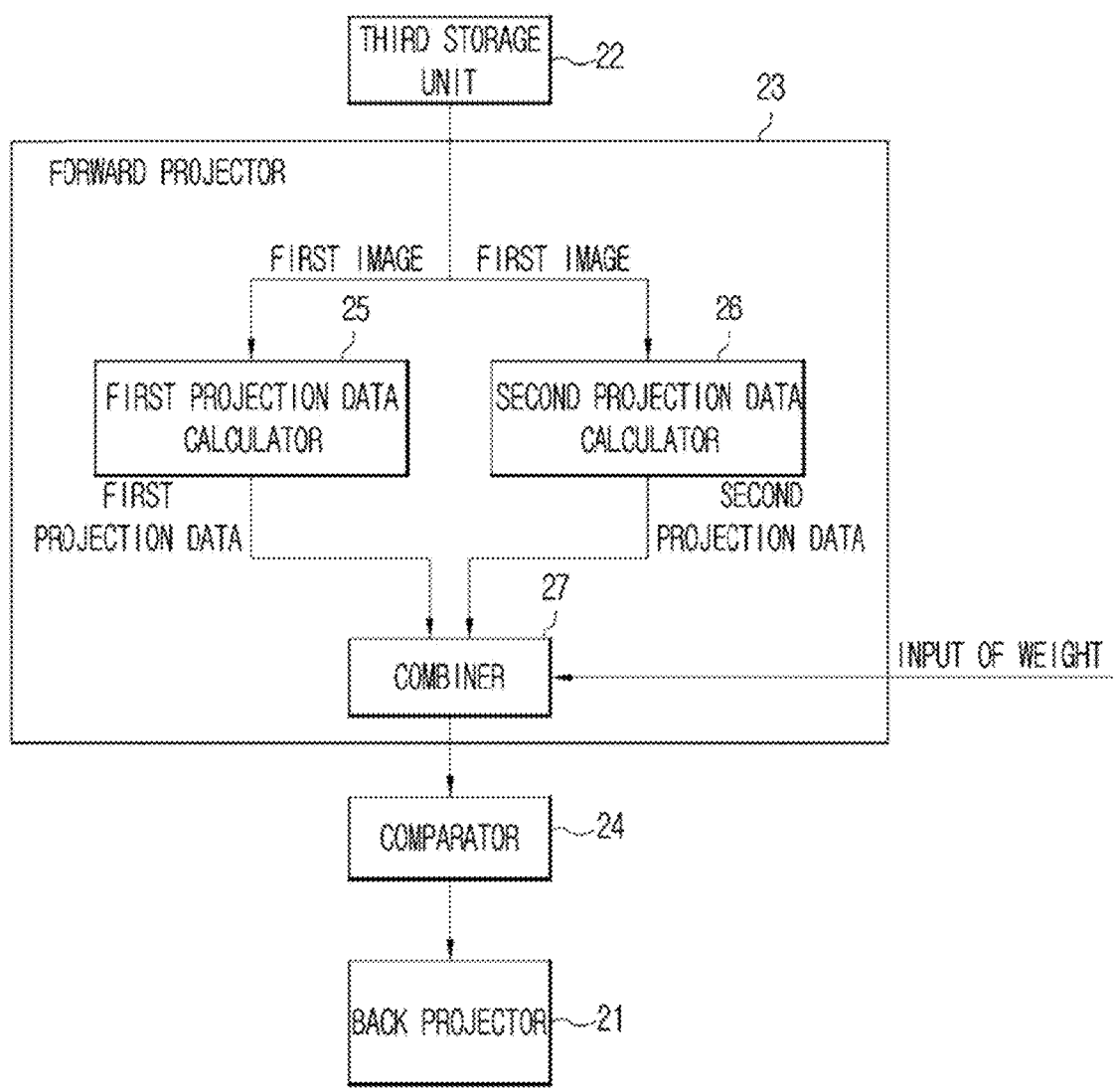

IMAGE PROCESSOR, IMAGE RECONSTRUCTION METHOD, AND RADIATION IMAGING APPARATUS

CROSS-REFERENCE TO RELATED APPLICATION

This application claims priority from Korean Patent Application No. 10-2013-0099626, filed on Aug. 22, 2013 in the Korean Intellectual Property Office, the disclosure of which is incorporated herein by reference in its entirety.

BACKGROUND

1. Field

Methods and apparatuses consistent with exemplary embodiments relate to an image processor and an image reconstruction method.

2. Description of the Related Art

In general, a radiation imaging apparatus is an apparatus to acquire radiation images of tissues, structures, substances, or metabolism information of the inside of an object. In more detail, the radiation imaging apparatus may acquire information of the inside of the object by applying radiation to the object and detecting radiation transmitted through the object or detecting radiation generated from radioisotopes injected into the object, and generate radiation images based on the acquired information of the inside of the object. Here, a process of generating the same image as a raw image of the inner structure of the object based on the acquired information of the inside of the object is referred to as image reconstruction. As recently used radiation imaging apparatuses, there are a digital radiography (DR) apparatus, a computed tomography (CT) apparatus, a full field digital mammography (FFDM) apparatus, a positron emission tomography (PET) apparatus, a single photon emission computed tomography (SPECT), etc.

SUMMARY

Exemplary embodiments may address at least the above problems and/or disadvantages and other disadvantages not described above. The exemplary embodiments are not required to overcome the disadvantages described above, and may not overcome any of the problems described above.

One or more exemplary embodiments provide an image processor, a radiation imaging apparatus, and an image reconstruction method which may reduce artifacts in image reconstruction.

One or more exemplary embodiments also provide an image processor, a radiation imaging apparatus, and an image reconstruction method which may use a complicated point spread function (PSF) in image reconstruction easily and efficiently.

In accordance with an aspect of an exemplary embodiment, an image processor includes a forward projector acquiring a forward projection value by performing forward projection of a first image of an object using a line integral-based value and a point spread function (PSF)-based value, and a back projector acquiring a second image of the object by performing back projection of raw image data using the forward projection value.

In accordance with an aspect of an exemplary embodiment, an image reconstruction method includes performing forward projection of a first image of an object using a line integral-based value and a PSF-based value to acquire a forward projection value, and performing back projection of raw image data using the forward projection value to acquire a second image of the object.

In accordance with an aspect of an exemplary embodiment, a radiation imaging apparatus used in the above-described image processor and image reconstruction method which is one of a DR apparatus, a CT apparatus, an FFDM apparatus, a PET apparatus, or a SPECT, includes a radiation detector receiving radiation transmitted through the inside of an object or generated from the inside of the object and converting the received radiation into electrical signals, and an image processor acquiring a first image of the object by performing back projection of the electrical signals, acquiring a forward projection value by performing forward projection of the first image using a line integral-based value and a PSF-based value, and acquiring a second image of the object by performing back projection of the electrical signals using the forward projection value.

In accordance with an aspect of an exemplary embodiment, a magnetic resonance imager (MRI) used in the above-described image processor and image reconstruction method includes a magnetic resonance collection unit collecting magnetic resonance signals of an object, and an image processor acquiring a first image of the object by performing back projection of the magnetic resonance signals, acquiring a forward projection value by performing forward projection of the first image using a line integral-based value and a PSF-based value, and acquiring a second image of the object by performing back projection of the magnetic resonance signals using the forward projection value.

BRIEF DESCRIPTION OF THE DRAWINGS

The above and/or other aspects will become more apparent by describing certain exemplary embodiments with reference to the accompanying drawings, in which:

FIG. 3 is a block diagram illustrating operation of a forward projector in accordance with an exemplary embodiment;

DETAILED DESCRIPTION

Figure 1:
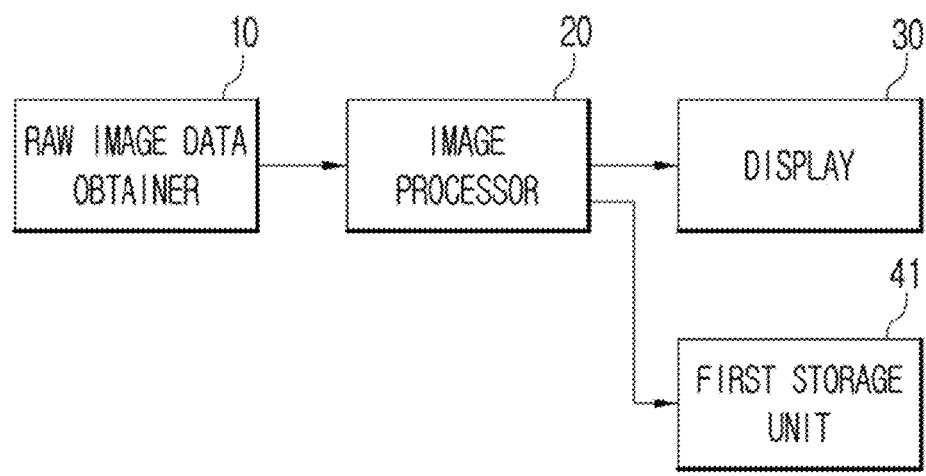
FIG. 1 is a block diagram illustrating the configuration of an image processing apparatus in accordance with an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Hereinafter, an image processing apparatus for image reconstruction in accordance with an exemplary embodiment will be described with reference to FIGS. 1 to 8.

FIG. 1 is a block diagram illustrating the configuration of an image processing apparatus in accordance with an exemplary embodiment. With reference to FIG. 1, the image processing apparatus may include a raw image data obtainer 10 and an image processor 20.

The raw image data obtainer 10 may acquire raw image data for image reconstruction of an object. The raw image data obtainer 10 may acquire raw image data in various manners according to kinds of the image processing apparatus.

For example, if the image processing apparatus is a radiation imaging apparatus, the raw image data obtainer 10 may receive radiation transmitted through the object or transmitted by the inside of the object, and acquire raw image data by converting the received radiation into electrical signals. If the image processing apparatus is a DR apparatus or a CT apparatus, the raw image data obtainer 10 may include an irradiation device applying radiation to the object and a radiation detection device receiving radiation transmitted through the object. If the image processing apparatus is a PET apparatus, the raw image data obtainer 10 may include a radiation (gamma-ray) detection device including a plurality of detection pixels.

Otherwise, if the image processing apparatus is an MRI, the raw image data obtainer 10 may acquire raw image data by collecting magnetic resonance signals from the object according to nuclear magnetic resonance. The raw image data obtainer 10 may include static magnetic field coils, gradient coils, and RF coils so as to induce nuclear magnetic resonance of substances within the object, for example, atomic nuclei of water ($H_2O$).

The raw image data acquired by the raw image data obtainer 10 may be transmitted to the image processor 20. As needed, the raw image data may be converted into digital signals by an analog-digital converter and then transmitted to the image processor 20. Further, as needed, the raw image data may be amplified by a designated amplifier and then transmitted to the image processor 20.

The image processor 20 may reconstruct a designated image based on the raw image data.

In accordance with an exemplary embodiment, the image processor 20 may reconstruct the image by performing forward projection and back projection.

Figure 2A:
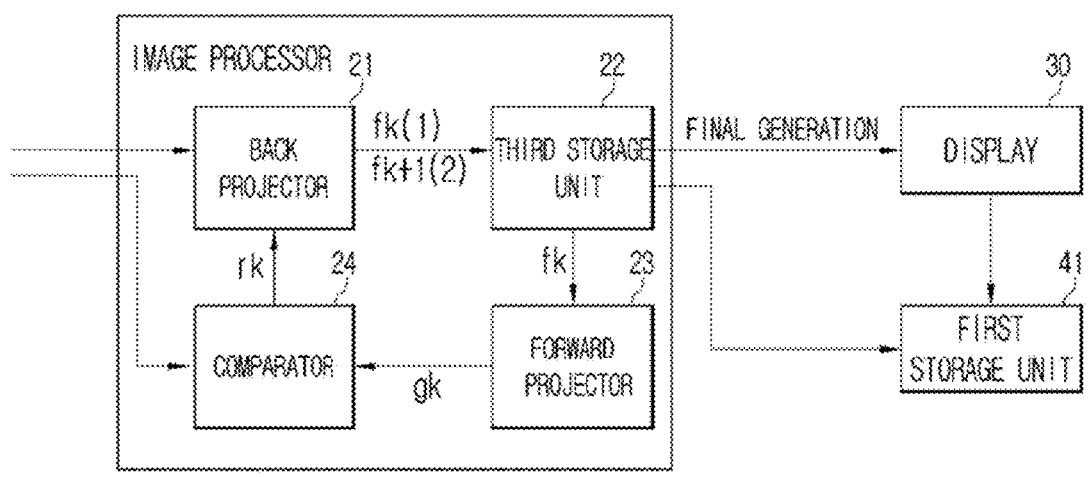
FIG. 2A is a block diagram illustrating the configuration of an image processor in accordance with an exemplary embodiment.

FIG. 2A is a block diagram illustrating the configuration of an image processor in accordance with an exemplary embodiment.

With reference to FIG. 2A, the image processor 20 in accordance with an exemplary embodiment may include a back projector 21, a forward projector 23, and a comparator 24.

The back projector 21 may acquire an image of the object by performing back projection based on the raw image data. The forward projector 22 may perform forward projection of the image of the object acquired according to performance of back projection.

Figure 2B:
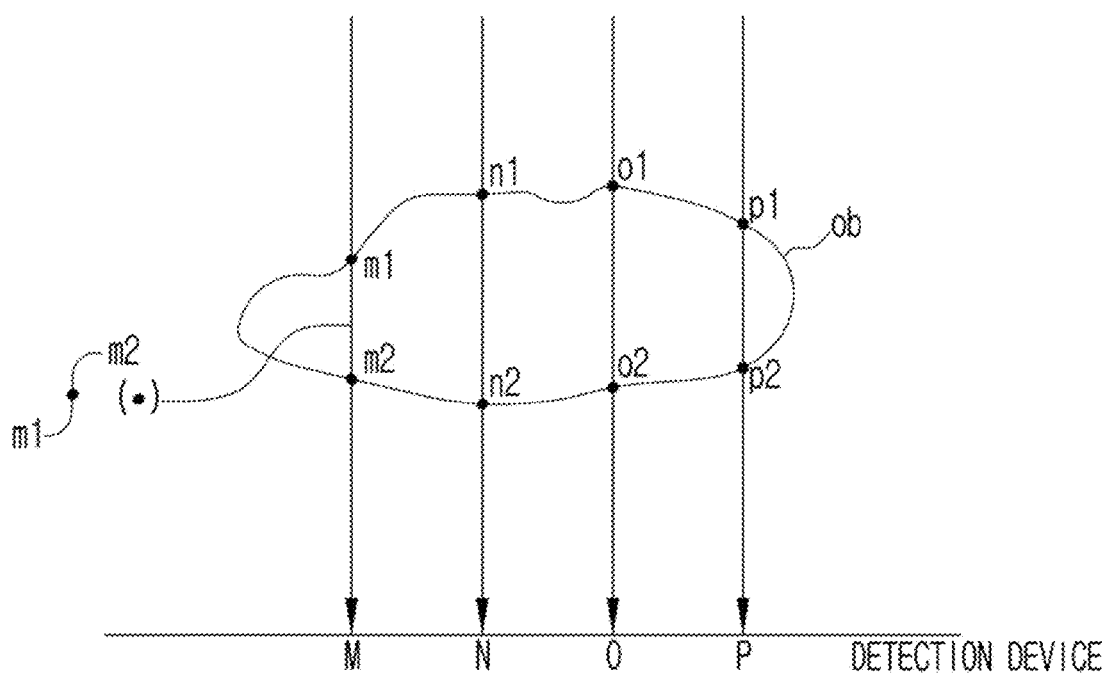
FIG. 2B is a view illustrating forward projection and back projection.

FIG. 2B is a view illustrating forward projection and back projection.

For example, in case of a DR apparatus or a CT apparatus, when the object is irradiated with designated radiation, the radiation penetrates the object and reaches a radiation detection device. The radiation is attenuated according attenuation rates of respective substances on a path along which the radiation penetrates the object, for example, a path between a point m1 and a point m2, and then reaches a pixel M at a specific point of the radiation detection device. As a result, the radiation detection device receives radiation attenuated by all the substances on the path along which the radiation penetrates the object, and generates and outputs electrical signals according to received signals. Therefore, information of the inside of the object detected by the pixel M at the specific point of the radiation detection device has information regarding all the substances present on the path along which the radiation penetrates the object, for example, the path between the point m1 and the point m2. When expressed mathematically, information detected by the pixel M at the specific point of the radiation detection device may be a result value of line integral of the attenuation rates of the substances present between the point m1 and the point m2 within the object.

Such a result is the same at pixels at different points of the radiation detection device, for example, a pixel N, a pixel O, and a pixel P. As exemplarily shown in FIG. 2B, an electrical signal generated from the pixel N has information of substances present between a point n1 and a point n2, an electrical signal generated from the pixel O has information of substances present between a point of and a point o2, and an electrical signal generated from the pixel P has information of substances present between a point p1 and a point p2.

If the radiation detection device generates electrical signals at the respective pixels M, N, O, and P in such a manner, reconstruction of information regarding the point m1 to the point m2, information regarding the point n1 to the point n2, information regarding the point o1 to the point o2, and information regarding the point p1 to the point p2 is referred to as back projection.

The back projector 21 may reconstruct a 2D or 3D image regarding the substances or structures within the object from the electrical signals detected by the radiation detection device through the above-described back projection.

According to an exemplary embodiment, the back projector 21 may perform back projection by applying an inverse function to the detected electrical signals, or perform back projection by selectively applying a designated function to the detected electrical signals. The back projector 21 may perform back projection using information of known substances, for example, water, soft tissues, such as adipose, and hard tissues, such as bones.

The back projector 21 may perform back projection based on the raw image data, and output a back projection result value $f_k$. As described above, the back projection result value $f_k$ may be a designated image. The back projection result value $f_k$ may be transmitted to the forward projector 23, or be transmitted to a third storage unit 22, as needed.

The third storage unit 22 may temporarily or non-temporarily store the back projection result value $f_k$. The third storage unit 22 may be a magnetic disk storage device or a memory storage device. According to an exemplary embodiment, the third storage unit 22 may be a buffer memory device.

The forward projector 23 may receive the back projection result value $f_k$ from the back projector 21 or the third storage unit 22, and perform forward projection of the back projection result value $f_k$.

Forward projection is projection of a designated object on a 1D straight line or a 2D plane, as exemplarily shown in FIG. 2B. In more detail, forward projection refers to acquisition of 1D or 2D information by projecting a 2D or 3D structure of the inside of the object on a 1D straight line or a 2D plane.

The forward projector 23 may acquire a 1D or 2D forward projection value by projecting the 2D or 3D image, acquired through back projection by the back projector 21, i.e., the back projection result value $f_k$.

In accordance with an exemplary embodiment, the forward projector 23 may perform forward projection using a line integral-based value and a PSF-based value. According to an exemplary embodiment, the forward projector 23 may perform forward projection by applying the line integral-based value and the PSF-based value to the back projection result value $f_k$.

FIG. 3 is a block diagram illustrating operation of a forward projector in accordance with an exemplary embodiment.

As exemplarily shown in FIG. 3, the forward projector 23 may include a first projection data calculator 25, a second projection data calculator 26, and a combiner 27.

The first projection data calculator 25 and the second projection data calculator 26 may individually receive the back projection result value $f_k$, i.e., a first image, from the back projector 21 or the third storage unit 22.

The first projection data calculator 25 may calculate first projection data $g_k$ by applying the line integral-based value to the back projection result value $f_k$ (the first image of FIG. 3).

Here, the line integral-based value may be a function, such as a designated matrix based on a line integral value within the object. Here, the line integral value within the object may be a value acquired through line integral of information, for example, attenuation rates, of substances on a designated line within the object, for example, the line between the point m1 and the point m2, as exemplarily shown in FIG. 2B. As exemplarily shown in FIG. 2B, plural lines (for example, the line between the point n1 and the point n2) may be defined within the object, and a line integral value of each of the plural lines may be calculated. A designated matrix may be made using the calculated plural line integral values. The designated matrix may be the line integral-based value.

The first projection data calculator 25 may calculate the first projection data $g_k^1$ using Equation 1 below.

$$g_k^1 = M f_k \quad \text{[Equation 1]}$$

Here, $g_k^1$ is the first projection data,

M is a line integral-based system matrix used as the line integral-based value which has been set in advance in the imaging apparatus by a user or a system designer, and $f_k$ is the back projection result value (the first image).

The second projection data calculator 26 may calculate second projection data $g_k^2$ by applying the PSF-based value to the back projection result value $f_k$ (the first image of FIG. 3), as exemplarily shown in FIG. 3.

The PSF is a function expressing blurring a specific point or a specific individual on an image to describe reaction of the image processing device to the input specific point. In the imaging apparatus, the PSF may vary according to the respective pixels of the detection device of the imaging apparatus or be spatially changed. Further, the PSF used in the imaging apparatus may be complicated.

The second projection data calculator 26 may use the PSF-based value, acquired based on the PSF, to reflect blurring of the specific point or the specific individual on the image. Here, the PSF-based value may be configured in the shape of convolution of at least one PSF. Otherwise, the PSF used to acquire the PSF-based value may be a known PSF which has been measured in advance.

The second projection data calculator 26 may calculate the second projection data $g_k^2$ using Equation 2 below.

$$g_k^2 = G f_k \quad \text{[Equation 2]}$$

Here, $g_k^2$ is the second projection data, G is a PSF-based system matrix used as the PSF-based value, and $f_k$ is the back projection result value (the first image). In the same manner as the above description, the PSF-based system matrix may be a PSF-based value which has been set in advance in the imaging apparatus by the user or the system designer.

When the first projection data calculator 25 acquires the first projection data $g_k^1$ using the line integral-based value and the second projection data calculator 26 acquires the second projection data $g_k^2$ using the PSF-based value, the first projection data $g_k^1$ and the second projection data $g_k^2$ may be transmitted to the combiner 27.

Figure 4:
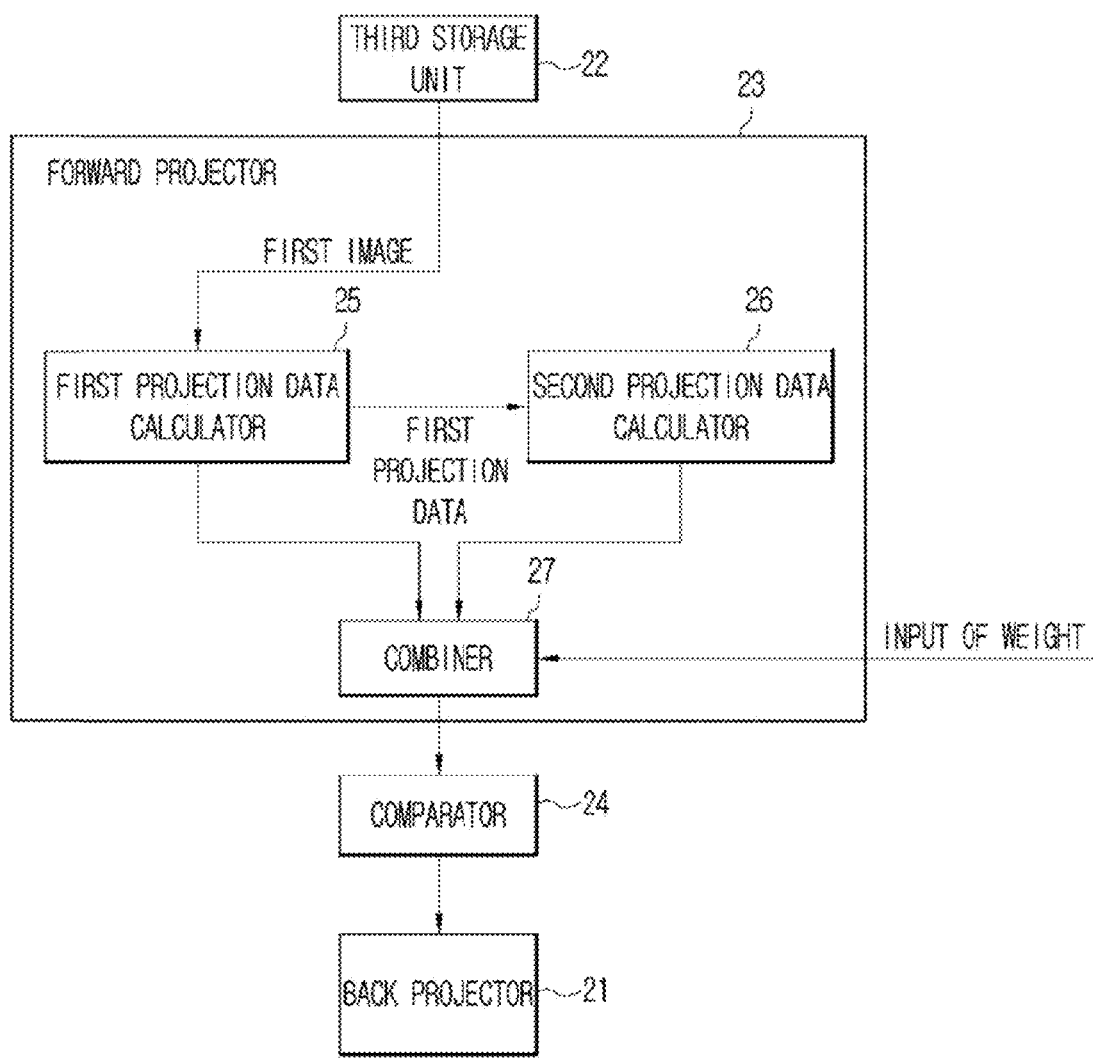
FIG. 4 is a block diagram illustrating operation of a forward projector in accordance with an exemplary embodiment.

FIG. 4 is a block diagram illustrating operation of a forward projector in accordance with an exemplary embodiment.

In accordance with the embodiment shown in FIG. 4, the back projection result value $f_k$, i.e., the first image, may be transmitted only to a first projection data calculator 25 and may not be transmitted to a second projection data calculator 26.

The first projection data calculator 25 may calculate first projection data $g_k^1$ by applying a designated line integral-based value to the back projection result value $f_k$, as described above. In this case, as exemplarily shown in FIG. 4, the first projection data $g_k^1$ generated by the first projection data calculator 25 may be transmitted to the second projection data calculator 26. Further, the first projection data $g_k^1$ may be transmitted to a combiner 27.

The second projection data calculator 26 may calculate second projection data $g_k^2$ by applying a PSF-based value to the first projection data $g_k^1$. The calculated second projection data $g_k^2$ may be transmitted to the combiner 27.

The combiner 27 may acquire a forward projection value by combining the first projection data $g_k^1$ and the second projection data $g_k^2$.

In accordance with an exemplary embodiment, the combiner 27 may combine the first projection data $g_k^1$ and the second projection data $g_k^2$ by applying a designated weight $\lambda$ to the first projection data $g_k^1$ and the second projection data $g_k^2$.

The combiner 27 may acquire the forward projection value using Equation 3 below.

$$g_k = \lambda G f_k + (1-\lambda) M f_k, \text{ where} \quad \text{[Equation 3]}$$

$g_k$ may be the forward projection value, $\lambda$ may be the weight,

G may be the PSF-based value,

M may be the line integral-based value, and $f_k$ may be the above-described back projection result value (the first image).

Here, the weight λ may be determined according to input of a user or settings of a system designer. Further, the weight λ may be determined by settings stored in advance in the imaging apparatus. Only one value may be used as the weight λ, or various values may be used as the weight λ. For example, a fixed value of 0.9 may be used as the weight λ, or various values between 0.8 and 0.9 may be used as the weight λ.

A process of calculating the forward projection value by the first projection data calculator 25, the second projection data calculator 26, and the combiner 27 may be sequentially performed in designated order, or be simultaneously performed.

As needed, the forward projection value may be calculated by directly applying data regarding the acquired first image to Equation 3, without separate calculation of the first projection data $g_k^1$ and the second projection data $g_k^2$.

The forward projection value $g_k$ acquired by the combiner 27 may be transmitted to the comparator 24, as exemplarily shown in FIG. 3.

The comparator 24 may calculate a comparison result value $r_k$ by comparing the acquired forward projection value $g_k$ and the raw image data.

The comparator 24 may calculate the comparison result value $r_k$ by calculating a ratio between the raw image data and the forward projection value $g_k$ or a difference between the raw image data and the forward projection value $g_k$, according to an exemplary embodiment. The comparison result value $r_k$ calculated by the comparator 24 may be transmitted to the back projector 21. The back projector 21 may again perform back projection of the raw image data using the comparison result value $r_k$ calculated by the comparator 24.

The back projector 21 may acquire a new back projection result value $f_{k+1}$ based on the back projection result value $f_k$ using the comparison result value $r_k$ calculated by the comparator 24.

In the embodiment in which the comparator 24 calculates a ratio between the raw image data and the forward projection value $g_k$, the back projector 21 may calculate the new back projection result value $f_{k+1}$ using Equation 4 below.

$$f_{k+1} = f_k \cdot \frac{p}{\lambda GF_k + (1-\lambda)Mf_k} \quad \text{[Equation 4]}$$

Here, $f_{k+1}$ is a newly acquired back projection result value, $f_k$ is the existing back projection result value, p is raw image data, $g_k$ is the forward projection value, λ is a weight, G is a PSF-based value, and M is a line integral-based value.

The back projector 21 may again transmit the new back projection result value $f_{k+1}$ to the forward projector 23 directly or indirectly through the third storage unit 32. When new back projection result value $f_{k+1}$ is transmitted to the forward projector 23 from the back projector 21, the forward projector 23 may acquire a new forward projection value $g_{k+1}$ by performing forward projection using the new back projection result value $f_{k+1}$ in the same manner as the above description. When the new forward projection value $g_{k+1}$ is acquired, the comparator 24 may calculate a new comparison result value $r_{k+1}$ according to a result of comparison of the forward projector 23. Then, the back projector 21 may calculate another new back projection result value $f_{k+2}$ based on the new comparison result value $r_{k+1}$.

The above-described process of acquiring the back projection result value through forward projection and back projection may be repeated until designated conditions are satisfied.

In accordance with an exemplary embodiment, the process of acquiring the back projection result value through forward projection and back projection may be repeated the number of times selected by a user or determined by a system designer.

In accordance with another exemplary embodiment, the process of acquiring the back projection result value through forward projection and back projection may be repeated until the comparison result value $r_k$ reaches 1 or 0.

If the back projector 21 calculates the new back projection result value $f_{k+1}$ using above-described Equation 4, when the ratio between the raw image data p and the forward projection value $g_k$, i.e., the comparison result value $r_k$, is 1, the new back projection result value $f_{k+1}$ is equal to the existing back projection result value $f_k$. Therefore, the above-described process of repeatedly acquiring a new back projection result value $f_{k+1}$ is not required, and the process of acquiring the back projection result value is not repeated anymore and may be terminated.

If the comparison operation unit 24 acquires the comparison result value $r_k$ by calculating a difference between the raw image data and the forward projection value $g_k$, when the comparison result value $r_k$ acquired by calculating the difference between the raw image data and the forward projection value $g_k$ is 0, the process of acquiring the back projection result value is not repeated anymore and may be terminated.

When repetition is terminated according to satisfaction of the requirement, the back projector 21 does not transmit the back projection result value $f_k$ to the forward projector 23, and may transmit the back projection result value $f_k$ to the third storage unit 32 or to a first storage unit 41 separately provided at the outside, as exemplarily shown in FIG. 1. Further, the back projector 21 may transmit the back projection result value $f_k$ to a display 30 so as to display the back projection result value $f_k$, i.e., a reconstructed image, to a user.

The above-described image processor 20 may include at least one processor and various memories, such as a buffer memory. The at least one processor of the image processor 20 may be operated as respective elements 21 to 24 of the image processor 20. The respective elements 21 to 24 of the image processor 20 may be implemented by individual processors, or most of the respective elements 21 to 24 of the image processor 20 may be implemented by one processor. Further, as needed, the respective elements 21 to 24 of the image processor 20 may be mounted in different devices. For example, the third storage unit 22 may be mounted in a computer device provided separately from a device in which the back projector 21, etc. are provided.

The above-described calculation process may be simultaneously or sequentially performed by the image processor 20. As needed, some of the intermediate calculation processes of the above-described calculation process, for example, calculation of the forward projection value $g_k$, is not separately performed and may be included in other calculation.

Hereinafter, reconstructed images will be described with reference to FIGS. 5 to 8. FIGS. 5 to 8 are views illustrating reconstructed images after imaging an object using a PET apparatus.

Figure 5:
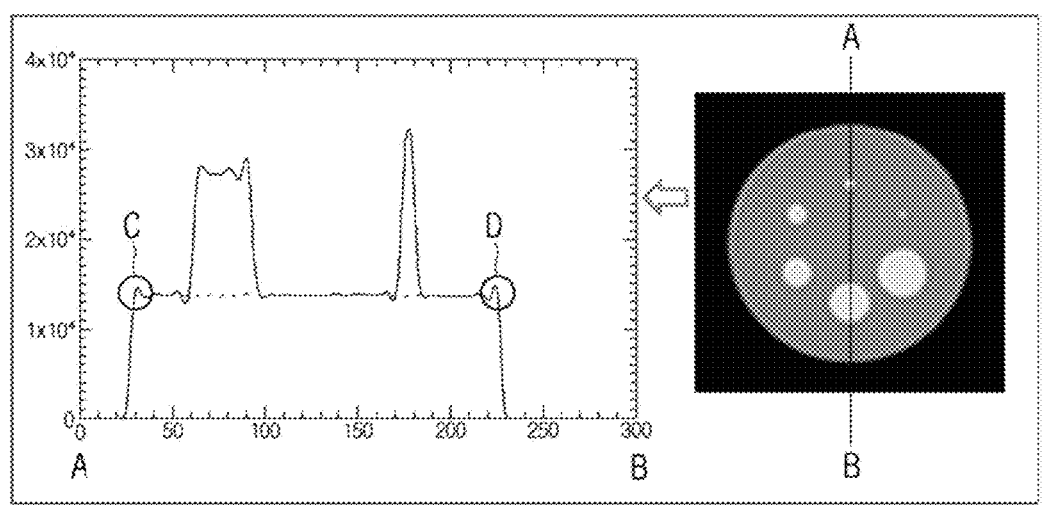
FIGS. 5, 6, 7, and 8 are views illustrating reconstructed images.

FIG. 5 is a view illustrating a reconstructed image using a PSF-based system matrix.

In FIG. 5, a right region illustrates a reconstructed image of an imaged object, and a left region illustrates a graph representing pixel values of the reconstructed image of the imaged object, taken along a designated line (the line A-B) of the image. As exemplarily shown in the left region of FIG. 5, it may be confirmed that some portions of a curve of the pixel values are not gentle and sharply protrude. Since boundary portions of the object in which pixel values are suddenly changed, for example, a portion C and a portion D, sharply protrude, Gibbs artifacts are generated at the boundary portions of the object, as exemplarily shown in the right portion of FIG. 5.

In this case, when the weighted sum of the first projection data $g_k^1$ and the second projection data $g_k^2$ is calculated using the designated weight $\lambda$, as described above, the sharply protruding portions may be corrected so as to be gentle.

Figure 6:
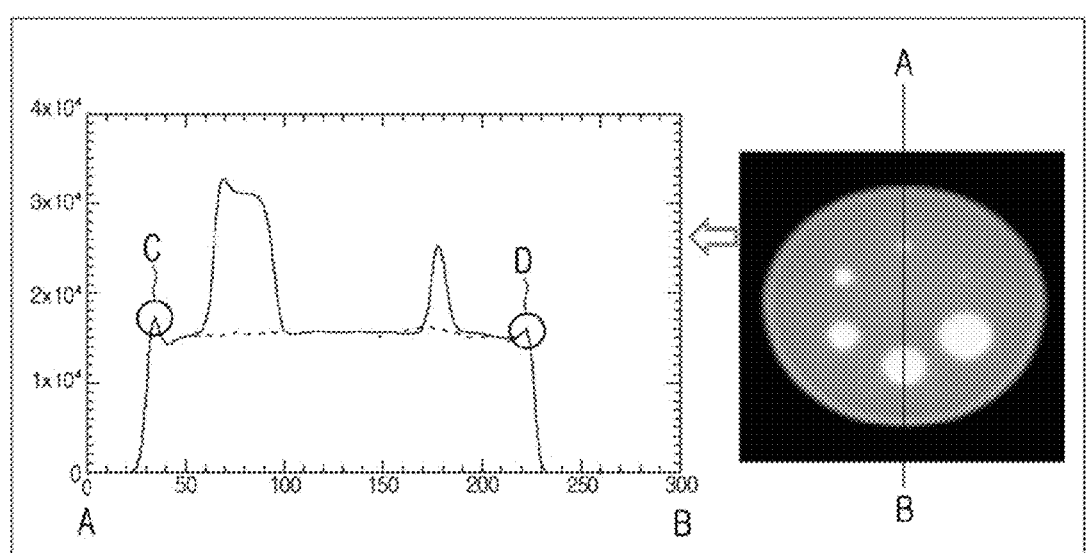
Figure 7:
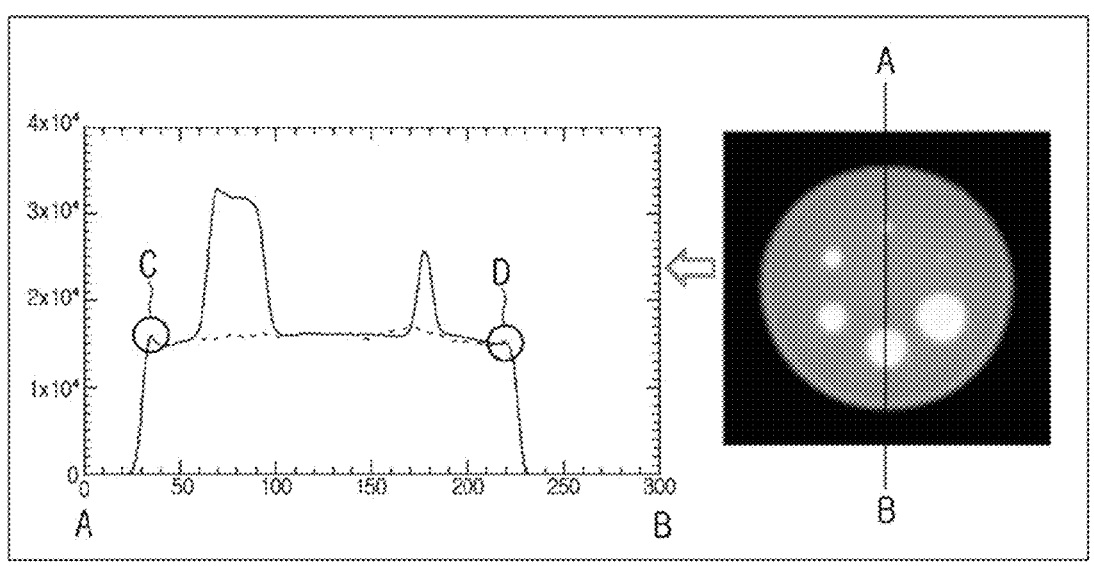
Figure 8:
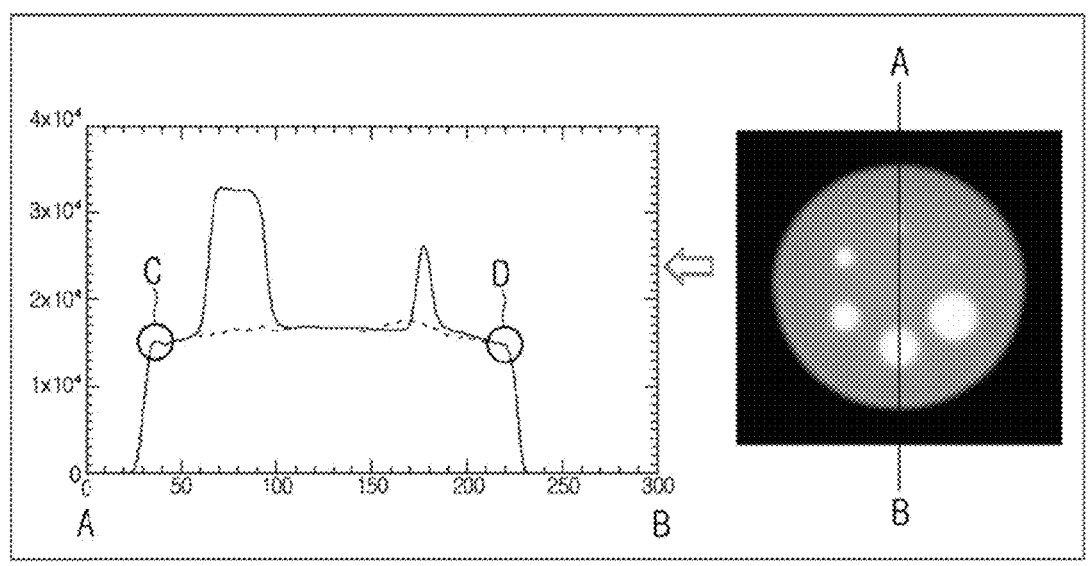

FIGS. 6 to 8 are views illustrating different reconstructed images according to weights.

FIG. 6 is a view illustrating a result of image reconstruction if the weight $\lambda$ used by the combiner 27 is 0.95, FIG. 7 is a view illustrating a result of image reconstruction if the weight $\lambda$ used by the combiner 27 is 0.9, and FIG. 8 is a view illustrating a result of image reconstruction if the weight $\lambda$ used by the combiner 27 is 0.8. Combination is performed using above-described Equation 3.

As exemplarily shown in FIGS. 6 to 8, it may be confirmed that, as the weight $\lambda$ increases, a curve of pixel values becomes gentle. It may be confirmed that, if the weight $\lambda$ used by the combiner 27 is 0.95, as exemplarily shown in FIG. 6, many portions of a curve of pixel values are gentler than the curve of FIG. 5. However, a portion C and a portion D of FIG. 6 still sharply protrude. It may be confirmed that, if the weight $\lambda$ is more decreased to 0.9 or 0.8, the portion C and the portion D become almost gentle and Gibbs artifacts are little generated in the image.

With reference to Equation 3, decrease in the weight $\lambda$ may be interpreted as increase in importance of the line integral-based value and decrease in importance of the PSF-based value. Therefore, if the first projection data $g_k^1$ and the second projection data $g_k^2$ are combined, when importance of the line integral-based value is increased and importance of the PSF-based value is decreased, Gibbs artifacts in the image may be reduced.

Hereinafter, a radiation imaging apparatus and a CT apparatus as one example of the radiation imaging apparatus will be described with reference to FIGS. 9 to 11.

Figure 9:
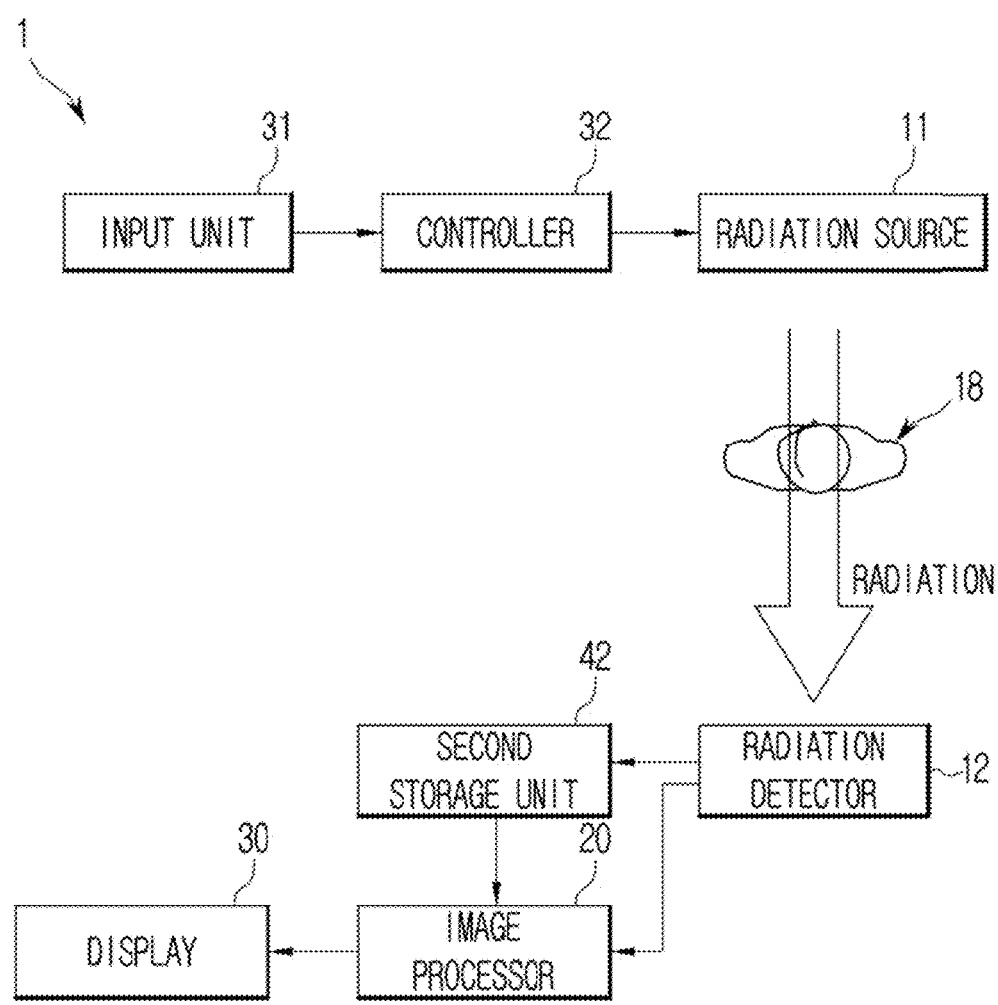
FIG. 9 is a block diagram illustrating the configuration of a radiation imaging apparatus in accordance with an exemplary embodiment.

FIG. 9 is a block diagram illustrating the configuration of a radiation imaging apparatus in accordance with an exemplary embodiment.

With reference to FIG. 9, the radiation imaging apparatus 1 may include a radiation source 11, a radiation detector 12, and an image processor 20. The radiation imaging apparatus 1 may further include a display 20, an input unit 31, a controller 32, and a second storage unit 42.

The radiation source 11 may generate radiation and apply the generated radiation to an object 18. Although not shown in FIG. 9, the radiation source 11 may include a radiation tube generating radiation and a power source applying designated tube voltage and tube current to the radiation tube.

The radiation tube may include a designated tubular body and an anode and a cathode separated from each other and installed within the tubular body.

The cathode may be provided with a filament or a carbon nanotube in which electrons are collected so as to emit an electron beam composed of the plural electrons to the anode. The filament of the cathode is heated according to voltage provided from the power source and transmits energy to the collected electrons, and the electrons are accelerated and move in the direction of the anode according to the received energy. The accelerated electrons are rapidly decelerated at the anode and emit designated radiation to the outside according to the law of conservation of energy.

The anode may be a fixed anode having a cylindrical or hexahedral shape provided with one surface cut at a designated cutting angle, or be a rotatable anode having a disc shape rotatable about a designated axis, according to an exemplary embodiment. The end part of the disc of the rotatable anode may be cut at a designated angle. A target surface, with which accelerated electrons collide so as to emit radiation, may be formed on the cutting surface of the fixed anode or the rotatable anode.

Radiation generated by collision of negative charges with the anode within the radiation tube may be emitted within a designated range in the cutting direction of the cutting surface or in the direction of the object 18 by a collimator installed around the radiation tube.

The radiation detector 12 may receive radiation transmitted through the object 18 or directly applied by the radiation source 10 and convert the received radiation into electrical signals, i.e., radiation signals. In more detail, the radiation detector 12 may include a radiation detection panel divided into a plurality of pixels, and the radiation detection panel may convert the received radiation into the radiation signals.

According to an exemplary embodiment, the radiation detector 12 may convert the received radiation directly into radiation signals using a plural of electrodes and thin film transistors (TFTs) (a direct method), or may convert the received radiation into visible light using a scintillator or a phosphor screen, convert the visible light into radiation signals, and then output the radiation signals (an indirect method).

The radiation signals converted by the radiation detector 12 may be transmitted to the image processor 20. According to an exemplary embodiment, the radiation signals converted by the radiation detector 12 may be temporarily or non-temporarily stored in the second storage unit 42.

The image processor 20 may receive the radiation signals from the radiation detector 12 or the second storage unit 42 and reconstruct an image based on the received radiation signals, or may correct the image by performing designated post-processing of the reconstructed image.

In accordance with an exemplary embodiment, the image processor 20 may acquire a first image of the object 18 by performing back projection of the radiation signals, acquire a forward projection value by performing forward projection of the first image using the line integral-based value and the PSF-based value, and acquire a second image of the object 18 by performing back projection of the radiation signals using the forward projection value. The image processor 20 may acquire a third image by repeating forward projection and back projection after the second image has been acquired. Further, the image processor 20 may acquire an $(n-1)^{th}$ image by repeating forward projection and back projection n times.

The image processor 20 may calculate first projection data by applying the line integral-based value to the first image, acquired through back projection. The above-described Equation 1 may be used. The image processor 20 may calculate second projection data by applying the PSF-based value to the first image, acquired through back projection, simultaneously with or non-simultaneously with calculation of the first projection data. The above-described Equation 2 may be used. According to an exemplary embodiment, the image processor 20 may calculate the second projection data by applying the PSF-based value to the first projection data. Thereafter, the image processor 20 may acquire a synthesized forward projection value by calculating the weighted sum of the first projection data and the second projection data by applying a designated weight to the first projection data and the second projection data. The above-described Equation 3 may be used. A process of acquiring the forward projection value using the first image by the image processor 20 may be sequentially performed in designated order, or be simultaneously performed.

After acquisition of the forward projection value, the image processor 20 may calculate a comparison result value by comparing the forward projection value and the radiation signal. Here, the comparison result value may be a ratio between the forward projection value and the radiation signal or be a difference between the forward projection value and the radiation signal, according to an exemplary embodiment.

When the comparison result value has been calculated, the image processor 20 may acquire a second image by performing back projection of the radiation signal using the comparison result value.

In accordance with an exemplary embodiment, the image processor 20 may perform the above-described process a designated number of times according to designated conditions, for example, the number of times of repetition or the comparison result value.

Further, the image processor 20 may perform the above-described image processing process simultaneously or sequentially and, as needed, does not separately perform some of the intermediate processing processes of the above-described image processing process and may include some of the intermediate processing processes in other processing processes.

As needed, the image processor 20 may correct a reconstructed image by performing post-processing of the reconstructed image, and generate a 3D image using a plurality of images, as needed.

The image reconstructed by the image processor 20 may be transmitted to the display 30 so as to be displayed to a user.

Figure 10:
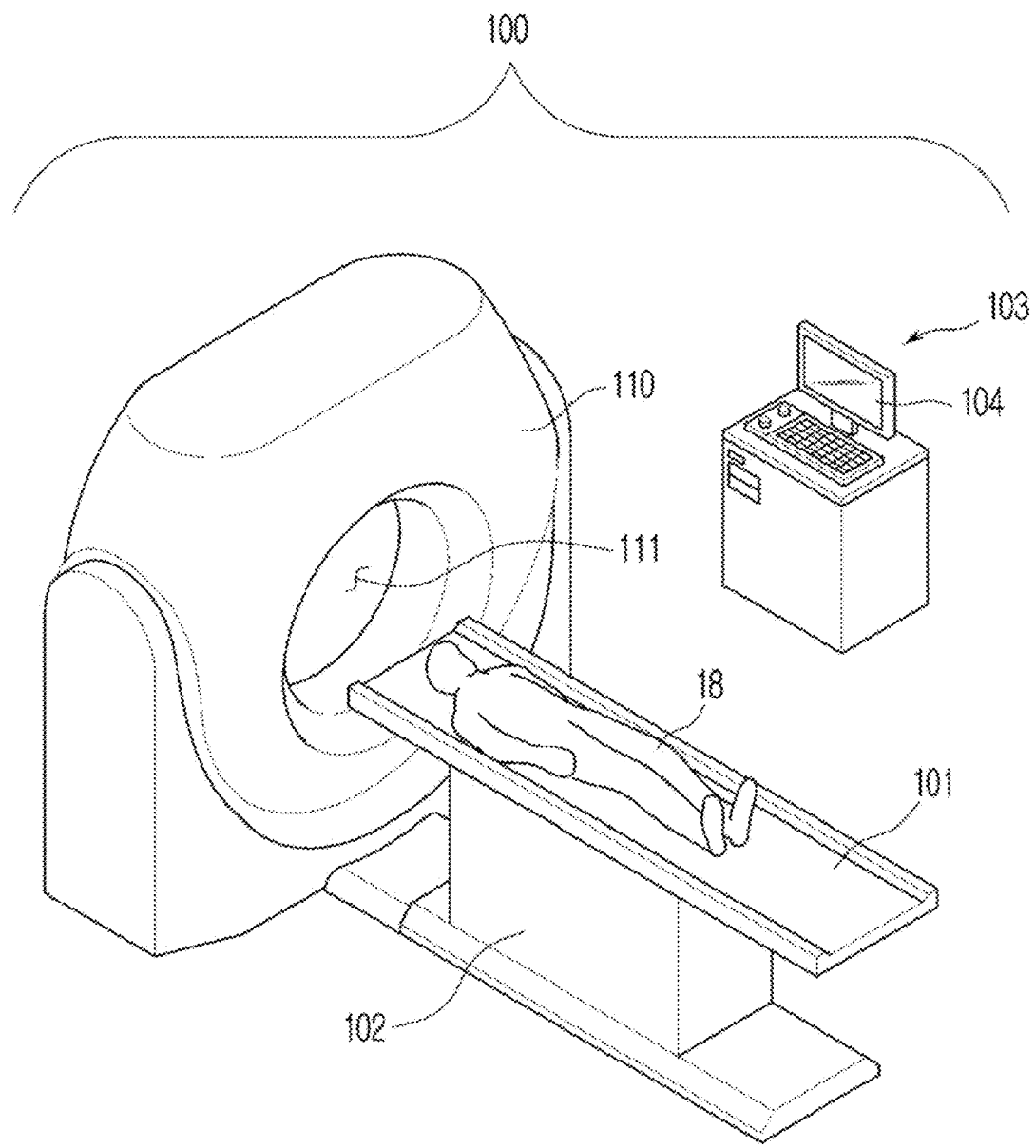
FIG. 10 is a perspective view of a CT apparatus in accordance with an exemplary embodiment.
Figure 11:
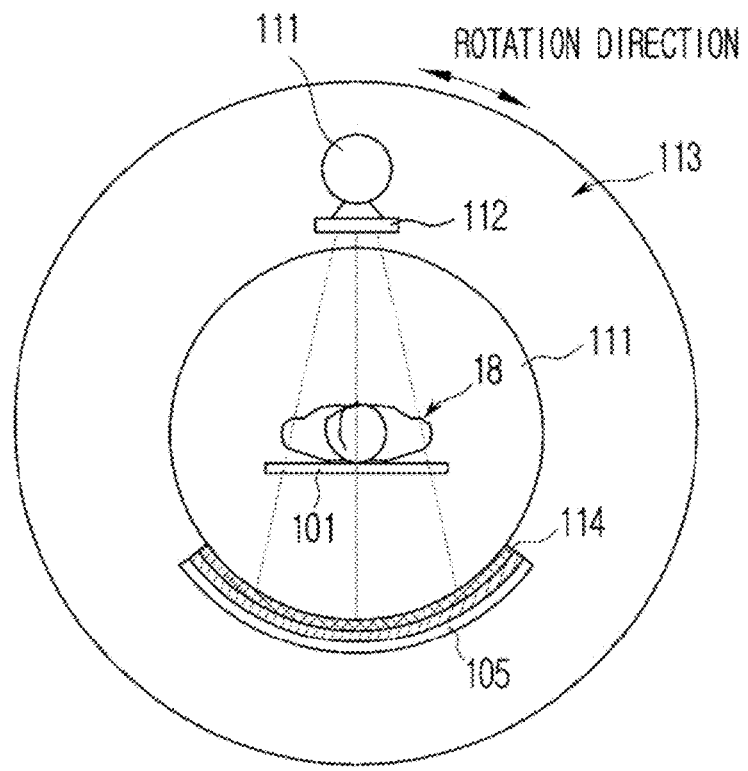
FIG. 11 is a view illustrating the CT apparatus in accordance with an exemplary embodiment.

FIG. 10 is a perspective view of a CT apparatus in accordance with an exemplary embodiment, and FIG. 11 is a view illustrating the CT apparatus in accordance with an exemplary embodiment.

In accordance with an exemplary embodiment, the radiation imaging apparatus may be a CT apparatus, as exemplarily shown in FIGS. 10 and 11.

With reference to FIGS. 10 and 11, the CT apparatus 100 may include a main body housing 110, a bore 111 formed in the center of the main body housing 110, a holding unit 101 fixing an object 18, such as a human body or an animal, to the upper end thereof and transferring the object 18 to the inside of the bore 111, and a supporter 102 supporting the holding unit 101. The holding unit 101 may transfer the object 18 to the inside of the bore 111 while moving to the inside of the bore 111 of the main body housing 110 by a driving device, such as a motor. The driving device moving the holding unit 101 may be formed at the inside or the outside of the supporter 102.

The CT apparatus 100 may include a designated workstation 103. A display 104 displaying radiation images to a user may be installed on the workstation 103, thus displaying images of the object 18 or various instructions to control the main body to the user. Further, the workstation 103 may include an input unit through which the user may input various control instructions of the CT apparatus 100. For example, the input unit may include at least one of a keyboard, a mouse, a tablet, a tablet pen, a track ball, and various other input devices.

The workstation 130 may be connected to the main body of the CT apparatus 100 through a wired or wireless communication network, generate various control instructions of the CT apparatus 100, and transmit the generated control instructions to the main body of the CT apparatus 100 so as to control the CT apparatus 100.

With reference to FIG. 11, a gantry 113 rotatable about a designated axis may be provided within the main body housing 110. The gantry 113 may be rotated at a designated angular velocity according to control instructions transmitted from the workstation 130. Rotation of the gantry 113 may be carried out by a gantry driving unit (not shown), such as a motor.

In the gantry 113, an radiation source 112 generating radiation and applying the generated radiation to the object 18, and a radiation detector 114 receiving the radiation applied by the radiation source 112 and converting the received radiation into radiation signals. The radiation source 112 and the radiation detector 114 may have the same structures, and generate radiation and convert the received radiation into radiation signals using the same principle, as the radiation source 11 and the radiation detector 12 described above with reference to FIG. 9.

When the gantry 113 is rotated by the gantry driving unit, the radiation source 112 and the radiation detector 114 installed in the gantry 113 may be rotated in a specific direction (in the clockwise direction or counterclockwise direction of FIG. 11) according to the gantry 113.

When the CT apparatus 100 starts computed tomography, the object 18 may be transferred to the inside of the bore 111, and the gantry 113 may be rotated at a designated angular velocity input by a user or a predetermined angular velocity. During rotation of the gantry 113, the radiation source 112 may apply radiation of a designated energy spectrum to the object 18, receive radiation transmitted through the object 18, and convert the received radiation into radiation signals. The radiation source 112 is also rotated along a circular trajectory around the object 18 according to rotation of the gantry 113 and may, thus, apply radiation to the object 18 in all directions. The radiation detector 114 is also rotated in the same manner and may, thus, receive radiation transmitted through the object 18 in all directions. Since the object 18 continuously moves in the inward direction of the housing 110 while the radiation source 112 is rotated and applies radiation to the object 18, the radiation source 112 applies radiation while moving along a spiral trajectory around the object 18 and the radiation detector 114 receives radiation while moving along the same spiral trajectory and converts the received radiation into radiation signals.

The acquired radiation signals may be transmitted to a processor installed within the main body housing 110 or a processor provided in the workstation 103, and the processor installed within the main body housing 110 or the processor provided in the workstation 103 may reconstruct an image based on the radiation signals. In accordance with an exemplary embodiment, the processor installed within the main body housing 110 or the processor provided in the workstation 103 may reconstruct the image of the object 18 through a process of performing back projection of the radiation signals, performing forward projection using a line integral-based value and a PSF-based value, and then again performing back projection of the radiation signals based on a forward projection result. Such a forward projection and back projection process may be repeated a designated number of times according to user selection or system settings. The structure and operation of such a processor may be the same as the structure and operation of the above-described image processor 20 and reconstruct a radiation image using the same principle as that of above-described image processor 20, and a detailed description thereof will thus be omitted.

Hereinafter, in accordance with another exemplary embodiment, a PET apparatus will be exemplarily described as another example of the radiation imaging apparatus with reference to FIGS. 12 and 13.

Figure 12:
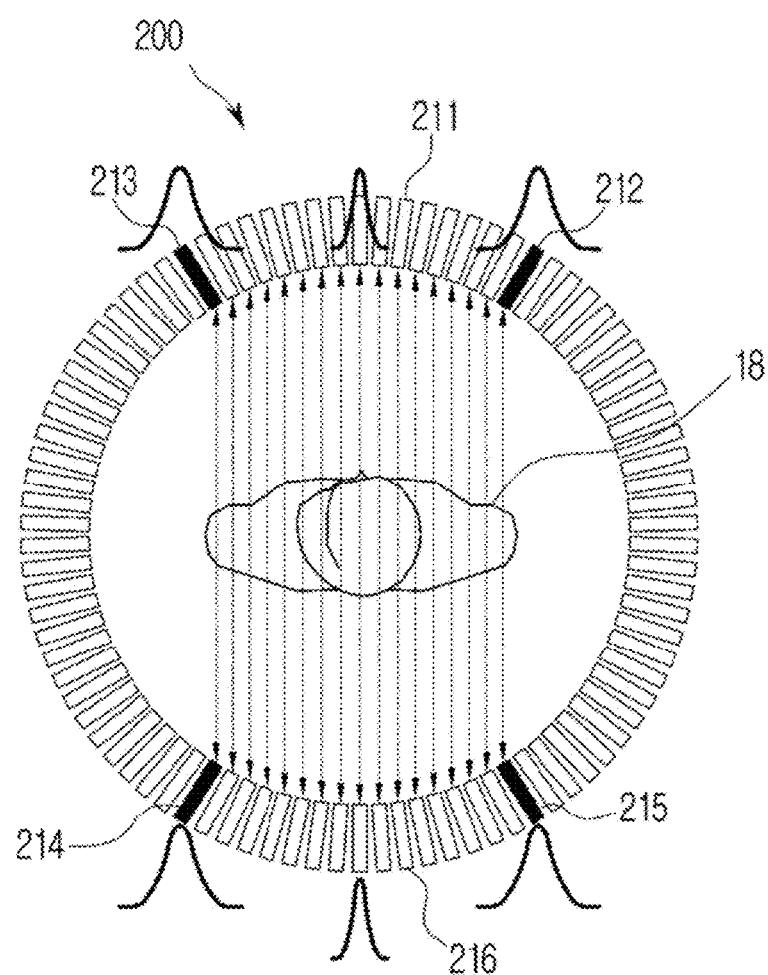
FIG. 12 is a view illustrating a PET apparatus in accordance with an exemplary embodiment.

FIG. 12 is a view illustrating a PET apparatus in accordance with an exemplary embodiment.

The PET apparatus 200 is a radiation imaging apparatus which detects substances, tissues and structures within an object, such as a human body, by injecting radioisotopes emitting positrons into the inside of the object and collecting radiation generated when the positrons emitted by the radioisotopes collapse, more particularly, gamma rays. The PET apparatus 200 may generate the image of the inside of a human body by collecting radiation and, thus, be one example of the radiation imaging apparatus.

In more detail, a radioisotope may collapse within the object and emit about 1 positron. In this case, it is known that the collapse probability of the radioisotope is 96.7 to 99.9%. Radioisotopes used by the PET apparatus 200 may include carbon (C), nitrogen (N), oxygen (O), and fluorine (F).

The positron emitted by collapse of the radioisotope collides with an adjacent electron and thus disappears. Then, based on the law of conservation of energy during pair annihilation, two radioactive rays, i.e., gamma rays, are generated. The generated two gamma rays proceed in opposite directions, as exemplarily shown in FIG. 12, based on the law of conservation of momentum. Here, energy of the generated gamma rays may be energy of 511 KeV corresponding to the rest mass of the electron.

The PET apparatus 200 may collect gamma rays generated from the inside of the object 18, and generates a radiation image based on the collected gamma rays.

In more detail, as exemplarily shown in FIG. 12, the PET apparatus 200 may include a detector 210 including a plurality of detection pixels 211 to 216 surrounding the object 18. The plural detection pixels 211 to 216 of the detector 210 may be arranged in a circular shape around a designated origin, and the respective detection pixels 211 to 216 may face in the direction of the designated origin. The object 18 may be located at the designated origin.

The respective detection pixels 211 to 216 may receive gamma rays generated from the inside of the object 18, convert the received gamma rays into electrical signals, and acquire designated radiation signals corresponding to the received gamma rays, i.e., raw image data. Since the above-described two gamma rays are emitted in opposite directions, as described above, detection pixels located at opposite positions with respect to the object 18, for example, the detection pixel 211 and the detection pixel 216, may receive gamma rays generated by pair annihilation of the same pair.

The detection pixels 211 to 216 of the PET apparatus 200 may simultaneously detect gamma rays emitted in opposite directions.

As described above, the respective detection pixels 211 to 216 of the PET apparatus 200 may be arranged toward the designated origin. Therefore, some detection pixels, for example, the detection pixel 211 and the detection pixel 216, may receive gamma rays generated from the inside of the object 18 in the vertical direction, and other detection pixels, for example, the detection pixel 212 and the detection pixel 213, may receive gamma rays generated from the inside of the object 18 in the diagonal direction. As a result, when the gamma rays received by the detection pixel 211 and the detection pixel 216 are converted, radiation signals of a sharp bell-shaped curve may be acquired, as exemplarily shown in FIG. 12. On the other hand, when the gamma rays received by the detection pixel 212 and the detection pixel 213 are converted, radiation signals of a gentle bell-shaped curve may be acquired. Radiation signals of the same-shaped curved may be acquired by the detection pixels at the opposite side, i.e., the detection pixel 214 and the detection pixel 215. That is to say, although the same imaging apparatus is used, shapes of acquired radiation signals may be different according to gamma ray emission positions within the object 18, i.e., the positions of the detection pixels receiving gamma rays.

In accordance with an exemplary embodiment, the PET apparatus 200 may reconstruct an image while minimizing artifacts, even if shapes of acquired radiation signals are different.

Figure 13:
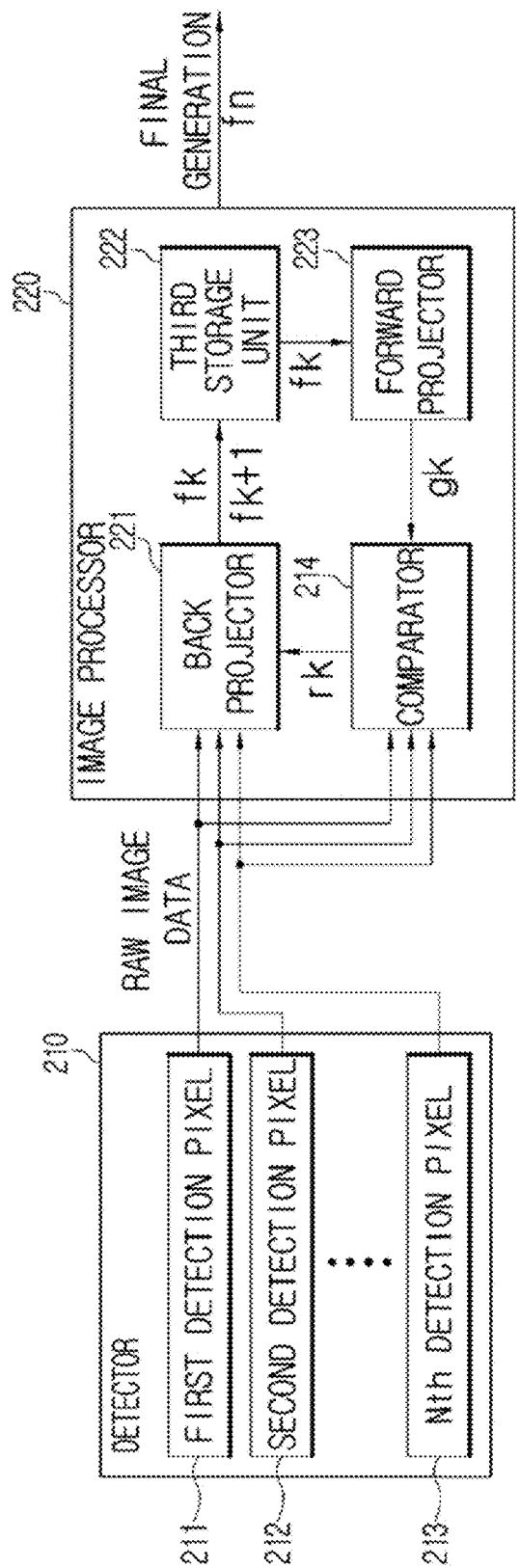
FIG. 13 is a block diagram illustrating the configuration of the PET apparatus in accordance with an exemplary embodiment.

FIG. 13 is a block diagram illustrating the configuration of the PET apparatus in accordance with an exemplary embodiment.

With reference to FIG. 13, respective detection pixels, for example, the first detection pixel 211 to the $n^{th}$ detection pixel 213, of the detector 210 of the PET apparatus 200 receive gamma rays generated from different positions, and outputs different radiation signals, i.e., raw image data, as exemplarily shown in FIG. 12.

The plural output radiation signals may be transmitted to an image processor 220.

The image processor 220 may be a processor installed directly within the main body of the PET apparatus 200 or a processor of a separate workstation connected to the PET apparatus 200.

The image processor 220, as exemplarily shown in FIG. 13, may include a back projector 211, a third storage unit 222, a forward projector 223, and a comparator 224.

The back projector 211 may acquire a back projection image, i.e., a $k^{th}$ image $f_k$, by performing back projection of the plural radiation signals. The generated $k^{th}$ image $f_k$ may be transmitted to the third storage unit 222 or the forward projector 223.

The third storage unit 222 may be the generated $k^{th}$ image $f_k$ temporarily or non-temporarily.

The forward projector 223 may perform forward projection of the $k^{th}$ image $f_k$ transmitted from the back projector 221 or the third storage unit 222. The forward projector 223 may perform forward projection of the $k^{th}$ image $f_k$ using a line integral-based value and a PSF-based value. The line integral-based value may be a line integral-based system matrix, and the PSF-based value may be a PSF-based system matrix. The forward projector 223 may calculate a forward projection value $g_k$ by applying line integral-based value to the $k^{th}$ image $f_k$ and applying the PSF-based value to the $k^{th}$ image $f_k$ and then calculating the weighted sum of the respective application results using a designated weight.

During such a process, the above-described Equation 1 to Equation 4 may be used. On the other hand, in accordance with an exemplary embodiment, the forward projector 223 may calculate a forward projection value $g_k$ by applying the PSF-based value to a result, acquired by applying the line integral-based value to the $k^{th}$ image $f_k$, and then calculating the weighted sum of the respective result values using a designated weight.

The comparator 224 may calculate a comparison result value $r_k$ using the forward projection value $g_k$, and transmit the calculated comparison result value $r_k$ to the back projector 221. The comparison result value $r_k$ represents that the forward projection value $g_k$ and the radiation signal are different, and may be defined as a ratio between the forward projection value $g_k$ and the radiation signal or a difference between the forward projection value $g_k$ and the radiation signal.

The back projector 211 may acquire a $(k+1)^{th}$ image $f_{k+1}$ by performing back projection of the radiation signals using the comparison result value $r_k$.

The above-described processing process by the image processor 220 may be expressed by Equation 5 below, in accordance with an exemplary embodiment. Equation 5 below mathematically expresses one example of application of the processing process to ordered subsets expectation maximization (OS-EM) algorithm which is one example of an optimization method used in reconstruction of a PET image by the PET apparatus 200.

$$\hat{f}^{i'} = \frac{f^{\hat{k}}}{G^T}\left(G^T \frac{p}{\lambda G f^{\hat{k}} + (1-\lambda) M f^{\hat{k}}}\right) \quad [\text{Equation 5}]$$

In Equation 5, $f^k$ and $f^{k+1}$ mean $k^{th}$ and $(k+1)^{th}$ estimated images,
p is a detected sonogram of the PET apparatus 200,
M is a line integral-based system matrix,
G is a measured PSF-based system matrix, and
$\lambda$ is a weight used in the above-described weighted sum.

Further, the processing process by the image processor 220 may be expressed by Equation 6 below, in accordance with another exemplary embodiment.

$$\hat{f}^{i'} = \frac{f^{\hat{k}}}{\{\lambda G + (1-\lambda)M\}^T} \left(\{\lambda G + (1-\lambda)M\}^T \frac{p}{\lambda G f^{\hat{k}} + (1-\lambda) M f^{\hat{k}}}\right) \quad [\text{Equation 6}]$$

In Equation 6, the meanings of respective marks are the same as those used in Equation 5.

The processing process by the image processor 220 may be applied to a PET image reconstruction method using another optimization method than the OS-EM algorithm.

The image processor 220 may repeatedly perform the above-described process at least once, or the plural number of times according to user selection or system settings. If the image processor 220 does not repeat the above-described process any more, the back projector 211 may transmit a finally acquired $n^{th}$ image $f_n$ to the third storage unit 222 or an external device. The finally acquired $n^{th}$ image $f_n$ may be stored in a storage device or displayed in a display device, and may be displayed in the display device in real time according to an exemplary embodiment.

Hereinafter, an image reconstruction method in accordance with an exemplary embodiment will be described with reference to FIG. 14.

Figure 14:
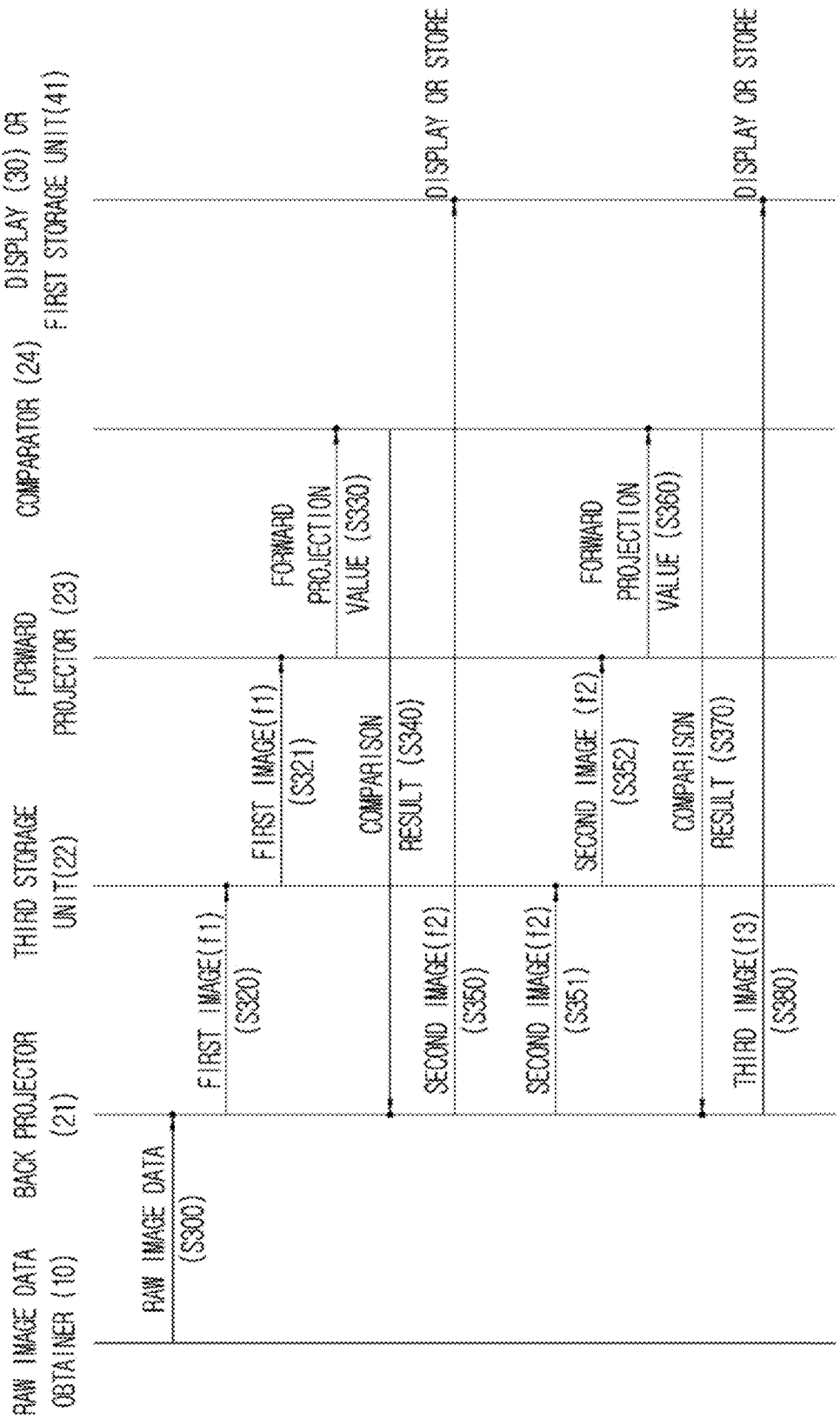
FIG. 14 is a flowchart illustrating an image reconstruction method in accordance with an exemplary embodiment.

FIG. 14 is a flowchart illustrating an image reconstruction method in accordance with an exemplary embodiment.

With reference to FIG. 14, in the image reconstruction method in accordance with an exemplary embodiment, the raw image data obtainer 10 collects raw image data and transmits the collected raw image data to the back projector 21 of the image processor 20 (Operation S300).

The back projector 21 may generate a first image $f_1$ by performing back projection of the raw image data and transmit the generated first image $f_1$ to the third storage unit 22 (Operation S320) or may directly transmit the generated first image $f_1$ to the forward projector 23 (Operation S320). If the third storage unit 22 receives the first image $f_1$ from the back projector 21, the third storage unit 22 may store the first image $f_1$ temporarily or non-temporarily and transmit the first image $f_1$ to the forward projector 23 (Operation S321).

The forward projector 23 may perform forward projection of the first image $f_1$ received from the back projector 21 or the third storage unit 22. The forward projector 23 may perform forward projection of the first image $f_1$ using a line integral-based value and a PSF-based value, and may perform forward projection of the first image $f_1$ by applying the line integral-based value and the PSF-based value to the first image $f_1$ and then calculating the weighted sum of application results. The forward projector 23 may transmit a forward projection value, generated as a result of forward projection, to the comparator 24 (Operation S330).

The comparator 24 may calculate a comparison result value using the forward projection value. The comparison result value calculated by the comparator 24 may be a difference or a ratio between the raw image data and the forward projection value. The comparison result value may be transmitted to the back projector 21.

The back projector 21 may again perform back projection of the raw image data using the comparison result value, and generate a second image $f_2$ as a result of back projection. The generated second image $f_2$ may be transmitted to the display 30 or the first storage unit 41. The display 30 may display the generated second image $f_2$ to a user. The first storage unit 41 may store the generated second image $f_2$ temporarily or non-temporarily (Operation S350).

According to an exemplary embodiment, the second image $f_2$ generated by the back projector 21 may be transmitted again to the third storage unit 22 or the forward projector 23 (Operation S351). The third storage unit 22 may store the received second image $f_2$ temporarily or non-temporarily and transmit the received second image $f_2$ to the forward projector 23 (Operation S352).

The forward projector 23 may perform forward projection of the second image $f_2$ received from the back projector 21 or the third storage unit 22 in the same manner as the above description. As a result of forward projection, a forward projection value may be generated, and the generated forward projection value may be transmitted to the comparator 24 (Operation 360).

The comparator 24 may calculate a comparison result value using the forward projection value in the same manner as the above description, and transmit the comparison result value again to the back projector 21 (Operation S370).

The back projector 21 may generate a third image $f_3$ by performing back projection of the raw image data using the comparison result value. In the same manner as the above description, the third image $f_3$ may be transmitted to the display 30 or the first storage unit 41. As needed, the third image $f_3$ may be transmitted to the third storage unit 22 or the forward projector 23 so as to repeat forward projection and back projection.

As apparent from the above description, an image processor and an image reconstruction method in accordance with an exemplary embodiment may reconstruct and acquire a high-quality image while reducing artifacts generated from the image, and perform image reconstruction using a complicated PSF.

Further, the image processor and the image reconstruction method may enhance resolution of an image in various kinds of radiation imaging apparatuses or an MRI.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art. For example, each single component may be separated into multiple components which are then separately implemented. Also, separated components may be combined together and implemented as a single component.

What is claimed is:

1. An image reconstruction method comprising:
   acquiring a first image of an object by performing a back projection of a raw image data;
   performing a forward projection of the first image of the object to obtain a first projection data, by applying a line integral-based value to a first area of the first image;
   performing a forward projection of the first image of the object to obtain a second projection data, by applying a point spread function (PSF)-based value to a second area of the first image, wherein the second area is identical to the first area to which the line integral-based value is applied;
   combining the first projection data and the second projection data to acquire a forward projection data value; and
   performing the back projection of the raw image data using the forward projection value to acquire a second image of the object.

2. The image reconstruction method according to claim 1, wherein the performing the forward projection further includes:
   acquiring the first projection data by applying the line integral-based value to the first image of the object; and
   acquiring the second projection data by applying the PSF-based value to the first image of the object.

3. The image reconstruction method according to claim 2, wherein the combining includes:
   acquiring the forward projection value by calculating a sum or a weighted sum of the first projection data and the second projection data.

4. The image reconstruction method according to claim 3, wherein the combining further includes:
   acquiring the forward projection value by applying a weight to the first projection data and the second projection data.

5. The image reconstruction method according to claim 4, wherein the combining further includes:
   acquiring a plurality of different forward projection values by varying the weight.

6. The image reconstruction method according to claim 1, wherein the performing the back projection includes:
   acquiring a comparison result value between the acquired forward projection value and the raw image data; and
   acquiring the second image by performing the back projection of the raw image data using the comparison result value.

7. The image reconstruction method according to claim 6, wherein the comparison result value is a ratio between the acquired forward projection value and the raw image data or a difference between the acquired forward projection value and the raw image data.

8. The image reconstruction method according to claim 1, further comprising:
   reconstructing an image of the object by iteratively performing the forward projection and the back projection.

9. An image processor comprising:
   a back projector configured to acquire a first image of an object by performing a back projection of a raw image data; and
   a forward projector configured to perform a forward projection of the first image of the object to obtain a first projection data, by applying a line integral-based value to a first area of the first image and to perform a forward projection of the first image of the object to obtain a second projection data, by applying a point spread function (PSF)-based value to a second area of the first image, wherein the second area is identical to the first area to which the line integral-based value is applied,
   wherein the forward projector is further configured to combine the first projection data and the second projection data to acquire a forward projection data value, and
   wherein the back projector acquires a second image of the object by performing the back projection of the raw image data using the forward projection value.

10. The image processor according to claim 9, wherein the forward projector is configured to acquire the first projection data by applying the line integral-based value to the first image of the object, and to acquire the second projection data by applying the PSF-based value to the first image of the object.

11. The image processor according to claim 10, wherein the forward projector is further configured to acquire the forward projection value by calculating a sum or a weighted sum of the first projection data and the second projection data.

12. The image processor according to claim 11, wherein the forward projector is further configured to acquire the forward projection value by applying a weight to the first projection data and the second projection data.

13. The image processor according to claim 12, wherein the forward projector is further configured to acquire a plurality of different forward projection values by varying the weight.

14. The image processor according to claim 9, wherein the back projector is further configured to acquire a comparison result value between the acquired forward projection value and the raw image data and acquire the second image by performing the back projection of the raw image data using the comparison result value.

15. The image processor according to claim 14, wherein the comparison result value is a ratio between the acquired forward projection value and the raw image data or a difference between the acquired forward projection value and the raw image data.

16. The image processor according to claim 9, wherein the forward projector is further configured to acquire again the forward projection value by performing the forward projection of the second image using the line integral-based value and the PSF-based value.

17. A radiation imaging apparatus comprising:
a radiation detector configured to receive radiation having passed through an object and convert the received radiation into electrical signals; and
an image processor configured to acquire a first image of the object by performing a back projection of the electrical signals, to acquire a forward projection value by performing a forward projection of the first image of the object to obtain a first projection data by applying a line integral-based value to a first area of the first image, performing a forward projection of the first image of the object to obtain a second projection data by applying a point spread function (PSF)-based value to a second area of the first image, wherein the second area is identical to the first area to which the line integral-based value is applied, and combining the first projection data and the second projection data to acquire a forward projection data value, and to acquire a second image of the object by performing the back projection of the electrical signals using the forward projection value.

18. The radiation imaging apparatus according to claim 17, wherein the image processor is further configured to acquire the forward projection value by calculating a sum or a weighted sum of the first projection data, acquired by applying the line integral-based value to the first image, and the second projection data, acquired by applying the PSF-based value to the first image.

* * * * *